L. BATCHLOR.
HANDSAW.
APPLICATION FILED OCT. 12, 1906.
920,414.
Patented May 4, 1909.
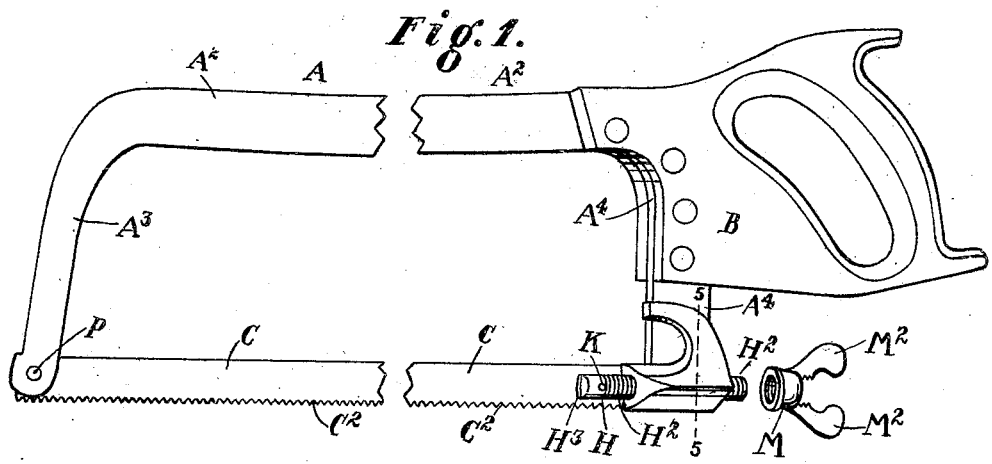
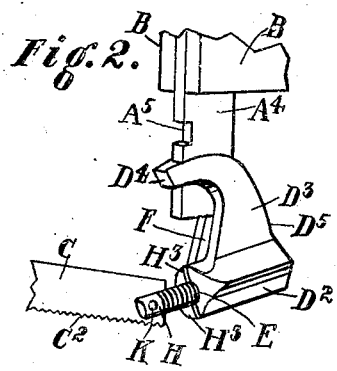
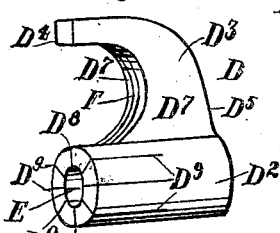
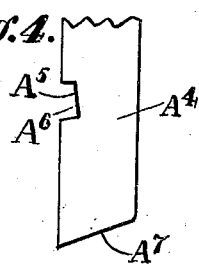
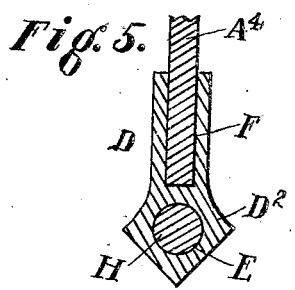
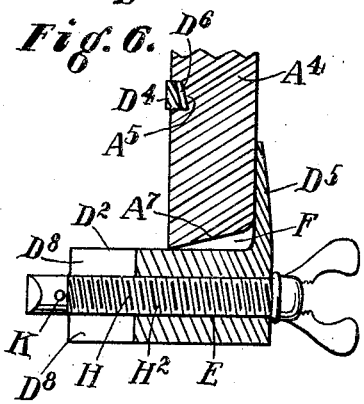
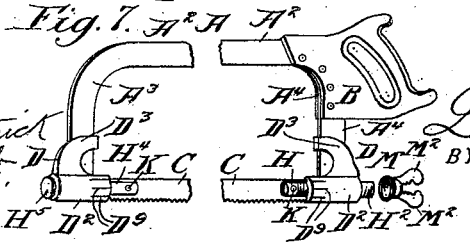
WITNESSES:
INVENTOR.
Landon Batchlor
BY
Wm. Hubbell Fisher
ATTORNEY.
THE NORRIS PETERS CO., WASHINGTON, D. C.

UNITED STATES PATENT OFFICE.

LANDON BATCHLOR, OF LAWRENCEBURG, INDIANA.

HANDSAW.

No. 920,414.      Specification of Letters Patent.      Patented May 4, 1909.

Application filed October 12, 1906. Serial No. 338,629.

*To all whom it may concern:*

Be it known that I, LANDON BATCHLOR, a citizen of the United States, and a resident of the city of Lawrenceburg, in the county of Dearborn and State of Indiana, have invented certain new and useful Improvements in Handsaws, of which the following is a specification.

The several features of my invention and the various advantages resulting from their use conjointly or otherwise will be apparent from the following description and claims.

In the accompanying drawings making part of this application, and in which similar letters of reference indicate corresponding parts,—Figure 1 is a view in perspective of a hand saw embodying my invention. In this view, the mid-portion of the saw frame and the mid-portion of the saw are broken away and removed so as to bring the picture of the saw within the limits of the sheet of drawing. In practice, the frame is ordinarily a continuous piece, and of course the main portion of the saw will be in one piece. The saw blade is of any desired length. Fig. 2 is a view in perspective of the rear end of the saw-blade and the lower end of the rear part of the saw-frame, and of the coupling devices for connecting the rear end of the frame to the rear end of the saw-blade. Fig. 3 is a perspective view of the coupling which holds the screw rod of the saw-blade and which is connected to the rear part of the saw frame. Fig. 4 is a side elevation of the rear end of the saw frame. Fig. 5 is a vertical, central cross section through the lower portion of the rear end of the saw frame, and through the coupling lock piece and through the screw rod which is linked to the saw-blade. This section is taken in the plane of the dotted line 5, 5, of Fig. 1. That face of the section is seen which faces toward the right in Fig. 1. Fig. 6 represents a vertical central section of the rear portion of the saw frame and of the coupling piece in position thereon. The screw rod is shown in elevation, in position within the coupling lock piece, and the nut is shown in place on the screw. Fig. 7 is a view in perspective of the hand saw embodying my invention. This figure is on a smaller scale than Fig. 1, and illustrates a mode of locating the saw blade at an angle to the vertical plane of the saw frame.

I will now proceed to describe my invention in detail.

A indicates the frame of the saw. This frame is a narrow piece of material, usually of metal, and its general shape is somewhat that of a bow. $A^2$ indicates the back or main part of the frame A. The front end portion $A^3$ bends at an angle to the back $A^2$. The rear end portion $A^4$ bends from the back at an angle. The entire frame is preferably made in one piece.

The handle B is connected to the rear portion of the saw frame, usually as shown, viz.: to the upper portion of the part $A^4$, and to the adjacent part of the back $A^2$. The connection is preferably made by rivets or screws which will not unscrew under ordinary use of the saw.

C indicates the saw blade having suitable teeth $C^2$.

My coupling piece D has a part $D^2$ which has a passage way E through it. The upper portion of this coupling piece has a slot F, but this slot is closed at the part $D^4$, in the upper front part of the coupling, and at the lower portion $D^5$ of the part $D^3$. This slot receives the lower portion of the rear end part $A^4$ of the saw frame A. The part $D^4$ has a rear inclination $D^6$. This part $D^4$ fits into a notch $A^5$ of the frame part $A^4$. The rear portion of this notch is preferably inclined at $A^6$ so as the better to fit the inclination $D^6$ of the part $D^4$ of the coupling. The bottom end of the frame part $A^4$ is inclined upward and rearward, which inclination is marked $A^7$.

In the passageway E of the part $D^2$ of the coupling is a screw rod H having a screw thread $H^2$. The forward end of this rod has a slot $H^3$, adapted to receive the adjacent end of the saw-blade C. When this end of the saw-blade C is in position in the screw rod H, a pivot K of the rivet form or of other suitable kind connects the saw-blade C and the rod H. The saw-blade is free to move on the pivot and the screw rod H can make an angle with it whenever the saw-blade and rod are not strained, as hereinafter mentioned.

A suitable nut M preferably of the thumb-nut order having handles $M^2$, $M^2$, is adapted to screw onto the screw thread $H^2$ of the screw rod H.

The front end of the saw-blade is suitably pivoted to the front portion $A^3$ of the saw by a pivot P.

In using the mechanism described, I duly connect the saw-blade C at P to the frame part $A^2$. I connect the screw rod H to the other end of the saw-blade by the pivot K. I insert the screw rod H in the passageway E. I apply the coupling piece D to the lower end of the frame part $A^4$, so that the latter enters the slot as shown in Fig. 2. The coupling piece D must now be inclined so that the rear end of the passageway E and the rear end of the rod are higher than their respective front ends. While in this position, the coupling piece is carried and slid up and the part $D^4$ can be and is put into the notch $A^5$ of the part $A^4$. As soon as the part $D^4$ is put into the said notch, the coupling part D can be and is moved so that the passageway E and the screw rod H are horizontal. Then the parts of the mechanism will respectively occupy the positions shown in Figs. 1, 5 and 6.

The nut M, if not already partially screwed up on the rod H, is now applied thereto, and in either case it is now screwed forward, thus tightening the parts. The coupling D, being in a stationary position on the frame piece $A^4$, every turn of the screw nut M tightens and finally strains (as it is termed), that is, holds taut the saw-blade C and the screw rod H.

In the front end of the eye piece, I provide the slots $D^8$, $D^8$, which are respectively on opposite sides of the eye piece, but are in a common plane.

When the saw-blade C, pivoted to the front end frame piece $A^3$ and at rear to the rod H is being put in place, as soon as the rod H is passed into and along in the passage E, the adjacent end of the saw-blade is introduced into the slots $D^8$, $D^8$, and when the rod H is drawn rearward by turning the nut M, the end portion of the saw-blade is drawn on in the slots $D^8$, $D^8$, until the saw-blade is fully strained. This prevents the saw-blade from rotation.

The inclination or bevel $A^7$ at the lower end of the frame part $A^4$ is important, as it permits the part $D^2$ (that is this eye piece) to be inclined, and the upper end of the coupling D to be moved forward, and the part $D^4$ thus removed from the notch $A^5$. Then the coupling piece D can be removed from the saw frame. But the coupling piece D cannot be thus inclined, so long as the saw-blade C and the screw rod H are strained. Therefore in order to remove the coupling, the nut M must be turned so that the screw rod H and the saw-blade C are not held taut.

The coupling piece D is put into place on the frame piece $A^4$ by reversing the movements used in taking it off from the frame piece $A^4$. The coupling piece D holds the rod H and the saw-blade C very strongly and firmly in place, and keeps them fully strained. It is successfully braced against, by and with the frame piece $A^4$. It is readily and quickly applied to the frame piece $A^4$, and as quickly removed. The rod H can be quickly put into the passageway E of the eye piece $D^2$, and as readily withdrawn.

Another marked advantage is that when the coupling has been put into place as illustrated in Figs. 1 and 6, it will not slip out of place and leave the frame piece $A^4$. Whether the nut M is screwed up tight on the rod H, or left on the rod H only partially screwed up, or is absent altogether from the rod H, the coupling will not slip off the frame piece $A^4$. To have it come away from this frame piece $A^4$, the bottom of the coupling must be moved back and be inclined up, and at the same time the upper front locking piece $D^4$ be moved forward and out of the notch $A^5$ of the frame piece $A^4$. Then it can be slid down and off from the frame piece $A^4$.

No lateral movement of the coupling D is permitted, because the latter embraces the frame piece $A^4$, the latter lying between the cheeks or sides $D^7$, $D^7$, of the part $D^3$ of the coupling piece D.

My saw is adapted to perform the various functions, for which frame saws of the class to which it belongs, are employed. In some cases, as in butchers' saws, etc., it becomes desirable to have the plane or width of the saw-blade at an angle to the general plane of the saw, viz.: of the saw frame. For example, such a position of the saw-blade is necessary in sawing what are known as resections. To enable the saw-blade to be thus located, I provide the eye piece $D^2$ with slots $D^9$, each one of a pair of slots being located at the opposite side of the passageway E, and being in a common plane, the latter passing through the theoretical center of the passageway E. Such pairs of slots are located in the eye piece $D^2$ at such angles as shall enable the saw-blade C to be located at the desired angle. The saw-blade C attached to the rod H as aforementioned is placed in position, its end at the rod H being inserted in that pair of the slots $D^9$ which are at the desired angle. The nut M is then tightened and the rod H and saw-blade C are strained in position.

It will be understood that, at the end $A^3$ of the saw frame A, there is, when in such cases the saw-blade is turned at an angle to the plane of the saw frame, a suitable device for connecting the saw-blade to this end $A^3$, so that the blade will there be at the same angle relatively to the saw frame as it is at the rear end $A^4$. One kind of such device is shown at the end $A^3$ of the saw frame, and consists of the coupling piece D shown in Fig. 3, and of a rod $H^4$ like rod H, but preferably without the screw thread $H^2$ and without the thumb nut M, $M^2$, $M^2$. But this rod H has a slot similar to the slot $H^3$ of the rod H, and a pivot K connecting the saw blade to the rod H⁴. The opposite end of the rod H⁴ is provided with a head H⁵ or equivalent means to prevent the rod H⁴ from sliding through the coupling piece D. The end A³ of the saw frame will be provided with the notch for receiving the part D⁴ of the coupling D.

When desired, the bottom of the front end A³ of the saw frame may have the inclination A⁷.

When desired, the entire device consisting of the coupling part D shown in the several figures and the rod H, H², H³, with pivot K and thumb nut M, M², M², may be employed at the front end as well as at the back end. Such application to either end or to both ends will obviously be mere reversal, or duplication.

The shape of the eye piece D² may in cross section be diamond shaped, as shown in Figs. 1, 2 and 5, or be many sided, or round. The latter form is illustrated in Fig. 3.

When slots such as D⁹ as well as the slots D⁸ are present in the eye piece D², then the said round shape shown in Fig. 3 is obviously preferable for it.

My improved coupling piece, described herein, may be used on the front end of the saw frame, instead of the pivot P, when such location of my invention is desirable, and the pivot P be transferred and used at the rear end, or as heretofore specified the coupling pieces of my invention may be present at both ends of the saw.

What I claim as new, and of my invention and desire to secure by Letters Patent, is:—

1. In a saw, a saw frame having the portion A⁴, provided at the front with a notch A⁵, and having its lower end inclined upward and rearward, in combination with a coupling-piece adapted below to hold the screw rod for engaging the saw blade, and provided above with slot F adapted to receive the lower part of the frame portion A⁴, and further provided at its upper front portion with a detent-part D⁴ adapted to enter the notch A⁵, the coupling-piece having the back D⁵, which in use rests against the rear part of the frame piece A⁴, substantially as and for the purposes specified.

2. In a saw, the frame having the portion A⁴, provided at its front edge portion with a notch A⁵, the back of the notch being inclined as shown, the lower end of this frame portion being inclined from the front upward toward the rear, in combination with a coupling-piece adapted below to hold the screw rod for engaging the saw-blade, and provided above with slot F adapted to receive the lower part of the frame portion A⁴, and also provided above in front with a detent-part D⁴, having an inclined end D⁶, adapted to enter the notch A⁵, the coupling-piece having the back D⁵, which rests against the part of the frame-piece A⁴, substantially as and for the purposes specified.

3. The combination of a saw frame having a back and two end pieces, each making an angle with the said back, a saw blade, a saw-straining device, a coupling-piece, adapted to hold the saw-straining device and to engage one of these end pieces of the frame at its inner edge and at its outer edge, the frame having a stop at the inner edge of it which prevents the accidental displacement of the coupling-piece, substantially as and for the purposes specified.

4. The combination of a saw frame, having a back and two end pieces, each end piece making an angle with the back, a screw rod, a coupling-piece adapted to hold the screw rod, and having a front projection adapted to engage the end piece, shaped to engage the front face of the end piece, and the coupling piece adapted to be inclined for removal, or for application, and the coupling provided with means for holding it laterally to the said end piece of the frame, substantially as and for the purposes specified.

5. In a saw, the frame having the portion A⁴, provided at its front edge portion with a notch A⁵, the back of the notch being inclined as shown, the lower end of this rear frame portion being inclined from the front upward toward the rear, in combination with a coupling-piece adapted below to hold the screw-rod for engaging the saw-blade, and provided above with slot F adapted to receive the lower part of the frame portion A⁴, and also provided above in front with the detent-part D⁴, having an inclined end D⁶, adapted to enter the notch A⁵, the coupling-piece having the back D⁵, which rests against the rear part of the frame-piece A⁴, the coupling-piece having the slits D⁸, to receive the adjacent end of the saw, substantially as and for the purposes specified.

6. In a saw, the combination of the frame having a portion A⁴, provided at its front edge with the notch A⁵, and having its lower end inclined upward and rearward, a straining device connected to the saw-blade, and a coupling-piece for holding the straining device, this coupling-piece having at its upper front portion a detent-part D⁴ adapted to enter the notch A⁵, and having at its rear the detent-part D⁵, adapted to engage with the frame, the front part of the coupling-piece being provided with slits D⁸, and with slots D⁹, at an angle to the plane of the slits D⁸, and means for retaining the coupling piece from lateral displacement, substantially as and for the purposes specified.

7. In a saw, the combination of the frame having a portion A⁴, provided at its front edge with the notch A⁵, and having its lower end inclined upward and rearward, a straining device connected to the saw-blade, and a coupling-piece for holding the straining device, this coupling-piece provided with a slot for receiving the frame, and having at its upper front portion a detent-part $D^4$ adapted to enter the notch $A^5$, and having at its rear the detent-part $D^5$, adapted to engage with the frame, the front part of the coupling-piece being provided with slits, and with slots $D^9$ at an angle to the plane of the slits $D^x$, substantially as and for the purposes specified.

8. In a saw, having the portion $A^3$ and the portion $A^4$, each of said portions $A^3$ and $A^4$ respectively provided at its inner edge with a notch, and two coupling-pieces, one engaging the notch of the frame portion $A^3$, and the other engaging the notch of the frame portion $A^4$, each coupling-piece having a rod rotatable within it, and having also radial slots $D^9$, parallel to its length, substantially as and for the purposes specified.

9. In a saw, a saw frame, and two end coupling-pieces, separable from the saw frame, and each adapted to engage the saw frame, rods for attachment to the saw blade, and respectively held within their respective adjacent couplings, means being present for retracting one of said rods, and means for enabling the plane of the saw to be located at an angle relative to the plane of the saw frame, substantially as and for the purposes specified.

10. In a saw, a saw frame, and two end coupling-pieces, separable from the saw frame, and each adapted to engage the saw frame, rods for attachment to the saw blade, and respectively held within their respective adjacent couplings, means being present for retracting one of said rods, each coupling provided in the eye thereof with radial slots, parallel to the length of the coupling for enabling the plane of the saw blade to be at an angle to the plane of the saw frame, substantially as and for the purposes specified.

In witness whereof, I have set my name to this specification in the presence of two subscribing witnesses.

LANDON $\overset{\text{his}}{\times}$ BATCHLOR.
mark.

Witnesses:
JOHN E. FITZPATRICK,
K. SMITH.